United States Patent
Isoda et al.

(10) Patent No.: US 9,071,111 B2
(45) Date of Patent: Jun. 30, 2015

(54) BLOWER APPARATUS AND METHOD FOR CONTROLLING BLOWER APPARATUS IN VEHICLE

(71) Applicant: Panasonic Corporation, Osaka (JP)

(72) Inventors: Mineaki Isoda, Osaka (JP); Daisuke Sato, Osaka (JP); Masahito Hidaka, Osaka (JP); Koji Kuyama, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/381,644

(22) PCT Filed: Jul. 9, 2013

(86) PCT No.: PCT/JP2013/004231
§ 371 (c)(1),
(2) Date: Aug. 28, 2014

(87) PCT Pub. No.: WO2014/020832
PCT Pub. Date: Feb. 6, 2014

(65) Prior Publication Data
US 2015/0015103 A1    Jan. 15, 2015

(30) Foreign Application Priority Data
Jul. 30, 2012   (JP) .................... 2012-167966

(51) Int. Cl.
*H02K 11/00*    (2006.01)
*B60K 11/06*    (2006.01)
(Continued)

(52) U.S. Cl.
CPC .............. *H02K 11/001* (2013.01); *B60K 11/06* (2013.01); *B60K 1/00* (2013.01); *F01P 7/026* (2013.01); *H02K 9/04* (2013.01)

(58) Field of Classification Search
CPC ........ B60K 11/06; H02K 11/001; F01P 7/026
USPC ................ 310/68 E, 68 A, 68 B, 68 C, 68 D; 318/817, 818, 819, 822
See application file for complete search history.

(56) References Cited

U.S. PATENT DOCUMENTS

| 7,965,004 B2 * | 6/2011 | Hornberger et al. ........ 310/68 B |
| 2002/0093259 A1 | 7/2002 | Sunaga et al. |

(Continued)

FOREIGN PATENT DOCUMENTS

| CN | 201049622 | 4/2008 |
| CN | 201584895 | 9/2010 |

(Continued)

OTHER PUBLICATIONS

International Search Report for PCT/JP2013/004231, Sep. 17, 2013.
(Continued)

*Primary Examiner* — Hanh Nguyen
(74) *Attorney, Agent, or Firm* — RatnerPrestia (57) ABSTRACT

The blower apparatus includes a motor; a fan; a motor drive circuit for electrically driving the coil; a microprocessor for controlling the motor drive circuit; and a motor case integrally incorporating the motor, the motor drive circuit, and the microprocessor. The blower apparatus further includes an internal power line for supplying power supply voltage Vig supplied to power supply input terminal Tv1, to the motor drive circuit and the microprocessor in the motor case; a smoothing capacitor connected to the internal power line; and a cut off control circuit for cutting off supply of the power supply voltage to the internal power line according to a command from the microprocessor.

5 Claims, 7 Drawing Sheets (51) Int. Cl.
  *B60K 1/00* (2006.01)
  *F01P 7/02* (2006.01)
  *H02K 9/04* (2006.01)

(56) References Cited

U.S. PATENT DOCUMENTS

2004/0201938 A1   10/2004   Watanabe et al.
2007/0230224 A1*  10/2007   Yamada et al. ............ 363/49

FOREIGN PATENT DOCUMENTS

| DE | 102009050693 | 4/2011 |
|---|---|---|
| JP | 58-211522 | 12/1983 |
| JP | 58-211522 A | 12/1983 |
| JP | 6-27433 U | 4/1994 |
| JP | 2002-291215 A | 10/2002 |
| JP | 2004-7970 A | 1/2004 |
| JP | 2006-254674 A | 9/2006 |
| JP | 2009-101950 A | 5/2009 |

OTHER PUBLICATIONS

The Extended European Search Report dated Dec. 19, 2014 for the related European Patent Application No. 13824863.8.

English Translation of Chinese Search Report dated Mar. 26, 2015 for the related Chinese Patent Application No. 201380019455.1.

* cited by examiner

BLOWER APPARATUS AND METHOD FOR CONTROLLING BLOWER APPARATUS IN VEHICLE

This application is a U.S. National Phase Application of PCT International Application PCT/JP2013/004231.

TECHNICAL FIELD

The present invention relates to a blower apparatus for blowing and cooling incorporated into a vehicle and to a method for controlling the blower apparatus in the vehicle, particularly to a blower apparatus that continues its rotation for cooling according to circumstances such as a thermal environment even after the ignition switch of the vehicle is turned off and to a method for controlling the blower apparatus.

BACKGROUND ART

Such a blower apparatus for cooling incorporated into a vehicle is used for cooling the engine or recently for cooling the battery of an electric vehicle for instance. An engine-cooling blower apparatus for instance continues its rotation for a certain period of time using a timer even after the engine is stopped, to blow and cool the engine if the engine coolant is still hot. Such a cooling operation after the engine is stopped, however, causes a current to continue flowing through the control circuit for a cooling operation in spite of the fact that the ignition switch has been turned off, which can cause a dead battery. Such a current that flows when an ignition switch is off is called dark current.

Under such circumstances, a circuit has been devised for controlling a cooling fan for a vehicle engine so as to rotate the fan for a certain period of time even after the ignition switch is turned off, while reducing dark current (refer to PTL 1 for example).

The circuit for controlling an engine cooling fan described in PTL 1 includes a thermal switch and a timer, where the thermal switch outputs a fan motor drive signal when the temperature of engine coolant is higher than a set level; and the timer times a given period of time after the ignition switch is turned off. This control circuit drives the fan motor when a fan motor drive signal is output, and stops driving the fan motor when the given period of time has elapsed. This cools the engine using the fan motor even after the engine stops when it is hot. When the ignition switch is turned off and the given period of time has elapsed, the control circuit cuts power to the thermal switch to eliminate dark current due to the thermal switch.

PTL 2 discloses an in-vehicle apparatus that includes a circuit for preventing an inrush current to a smoothing capacitor in a power supply.

For an existing control circuit of an engine-cooling fan described in PTL 1, the power supply remains connected to the timer after the ignition switch is turned off so as to operate the timer. This causes a small amount of current as dark current to flow through the timer even if the ignition switch has been turned off, which means that dark current is cut off incompletely.

CITATION LIST

Patent Literature

PTL 1 Japanese Patent Unexamined Publication No. S58-211522

PTL 2 Japanese Utility Model Unexamined Publication No. H06-27433

SUMMARY OF THE INVENTION

A blower apparatus of the present invention is a blower apparatus such that power supply voltage from a battery is supplied to a power supply input terminal through the power supply switch of which on-off control is made according to a state of the vehicle ignition switch. The blower apparatus includes a motor that has a stator with a coil wound therearound and a rotor placed rotatably about the rotation shaft; a blowing fan attached to the rotation shaft; a motor drive circuit that electrically drives the coil; a microprocessor that controls the motor drive circuit; and a motor case that integrally contains the motor, the motor drive circuit, and the microprocessor. The blower apparatus further includes an internal power line that supplies power supply voltage applied to the power supply input terminal to the motor drive circuit and the microprocessor in the motor case; a smoothing capacitor connected to the internal power line; and a cut off control circuit that cuts off supply of power supply voltage to the internal power line according to a command from the microprocessor.

This structure allows supplying the power supply voltage to the microprocessor and the motor drive circuit even after the ignition switch is turned off, which enables continuing rotation according to circumstances such as a thermal environment. Further, the cut off control circuit cuts off the supply of the power supply voltage to the internal power line that applies power to the microprocessor and the motor drive circuit according to a command from the microprocessor, which allows completely cutting off the supply of power from the power supply, thereby eliminating dark current.

The above-described cut off control circuit performs control so that the power supply switch turns off to cut off the supply of the power supply voltage to the internal power line.

The above-described cut off control circuit further includes, together with a first power supply input terminal that is the power supply input terminal, a second power supply input terminal to which the power supply voltage is directly supplied from the battery; and a resistor provided between the first power supply input terminal and the internal power line. This cut off control circuit may be configured so that the circuit has a switch element set between the second power supply input terminal and the internal power line; and performs control so that the switch element turns off to cut off the supply of the power supply voltage to the internal power line.

A method for controlling a blower apparatus in a vehicle of the present invention is a method for controlling a blower apparatus in a vehicle that includes a main control device performing main control of the vehicle, a power supply switch of which on-off control is made according to a state of the ignition switch by the main control device, and a blower apparatus that has a microprocessor operated on the power supply voltage supplied from a battery to the internal power line through the power supply switch. In the control method, when the ignition switch is turned on, the power supply switch turns on according to a command from the main control device, to supply the power supply voltage to the internal power line. Meanwhile, when the ignition switch is turned off, the microprocessor executes a given process for the blower apparatus, and then cuts off the supply of the power supply voltage to the internal power line according to a command from the microprocessor.

By such a method, the power supply voltage is supplied to the blower apparatus including the microprocessor even after the ignition switch is turned off, which allows continuing rotation according to circumstances such as a thermal environment. Further, the cut off control circuit cuts off the supply of the power supply voltage to the internal power line that applies power to the microprocessor and the motor drive circuit, according to a command from the microprocessor, which allows completely cutting off the supply of power from the power supply, thereby eliminating dark current.

By the control method, the microprocessor performs control according to a command so that the power supply switch turns off to cut off the supply of the power supply voltage to the internal power line.

By the control method, control may be performed so as to cut off the supply of the power supply voltage to the internal power line as follows. That is, the blower apparatus further includes a switch element that connects the power supply voltage directly supplied from the battery to the internal power line, and the microprocessor performs control according to a command so that the switch element turns off.

In this way, a blower apparatus and a method for controlling the blower apparatus in a vehicle according to the present invention allows continuing rotation according to circumstances such as a thermal environment even after the ignition switch is turned off and completely cuts off the supply of power from the power supply when the rotation ends, which eliminates dark current.

DESCRIPTION OF EMBODIMENTS

Hereinafter, a description is made of a blower apparatus according to some embodiments of the present invention with reference to the related drawings.

First Exemplary Embodiment

Figure 1:
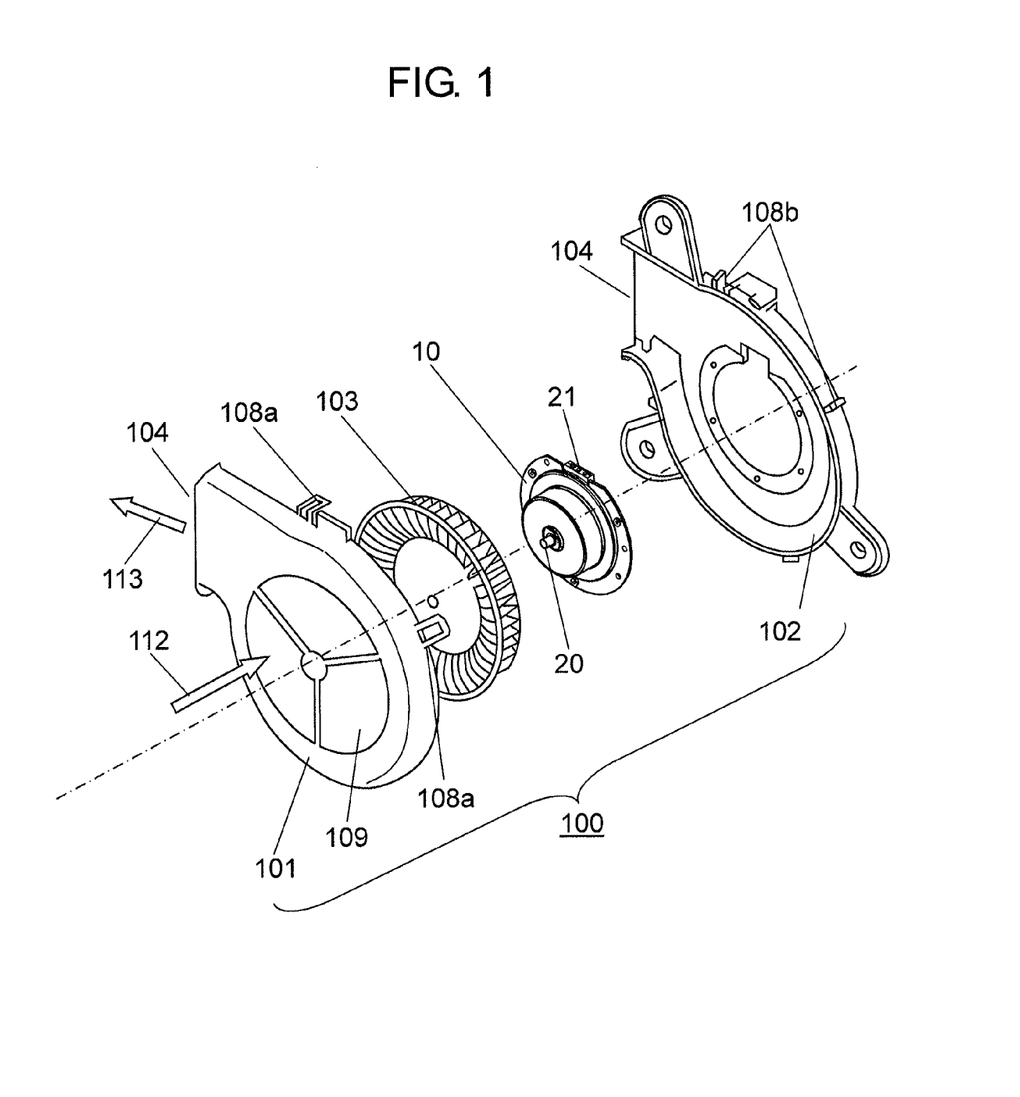
FIG. 1 is an exploded perspective view illustrating the structure of a blower apparatus according to the first exemplary embodiment of the present invention.

FIG. 1 is an exploded perspective view illustrating the structure of blower apparatus 100 according to the first exemplary embodiment of the present invention. As shown in FIG. 1, the housing of blower apparatus 100 is composed of front case 101 and rear case 102 joined together with engaging parts 108a and 108b. The housing contains motor device 10 fixed to rear case 102; and blowing fan 103 connected to motor device 10 through rotation shaft 20 of motor device 10. In this embodiment, fan 103 is a sirocco fan. Blower apparatus 100 is provided with open air inlet 109 in front case 101 and air outlet 104 open in the direction orthogonal to rotation shaft 20.

In such a structure of blower apparatus 100, applying power supply voltage and control signals from the outside to connector 21 of motor device 10 causes rotation shaft 20 of motor device 10 to rotate. Rotation of rotation shaft 20 causes fan 103 to rotate through rotation shaft 20. Then, outside air is drawn from air inlet 109 of the housing in the direction of arrow 112, and the outside air is blown out from air outlet 104 in the direction of arrow 113, to cool to-be-cooled objects such as an engine and a battery.

Figure 2:
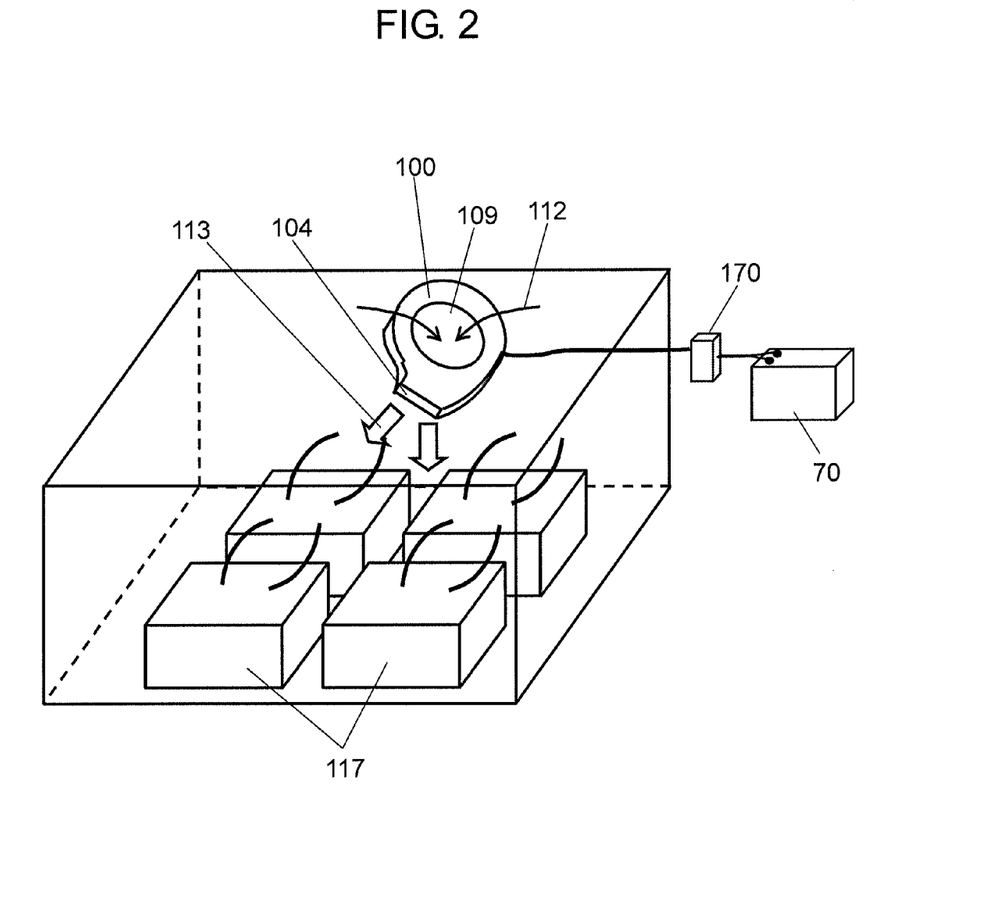
FIG. 2 illustrates an example of the blower apparatus for in-vehicle use.

FIG. 2 illustrates an example of blower apparatus 100 according to the first embodiment of the present invention used for an electric vehicle as in-vehicle use. FIG. 2 shows an example where blower apparatus 100 for in-vehicle use cools main battery 117 for propulsion. While a gasoline engine vehicle uses gasoline as a fuel, an electric vehicle runs by means of a battery engine that includes a motor rotated by power from a battery. Accordingly, an electric vehicle and a hybrid vehicle usually incorporate main battery 117 (i.e., a power source of the battery engine) and auxiliary battery 70 (for supplying power to in-vehicle electrical components). Blower apparatus 100 as an in-vehicle electrical component rotates by power supplied from auxiliary battery 70. FIG. 2 shows an example where power from auxiliary battery 70 is supplied to blower apparatus 100 through electricity distributor 170. In FIG. 2, arrows 112 and 113 indicate air flows generated when blower apparatus 100 is rotating.

In this embodiment, blower apparatus 100 has a function that continues rotation for cooling according to circumstances such as a thermal environment even after the vehicle ignition switch is turned off (further details are described later). More specifically, to cool main battery 117 as shown in FIG. 2, blower apparatus 100 continues rotation for a certain period of time when the temperature of main battery 117 exceeds a given level even after the vehicle has stopped. When the rotation ends, power supplied to blower apparatus 100 is cut off to avoid dark current.

Next, a description is made of the structure of motor device 10 included in blower apparatus 100 according to the embodiment of the present invention.

Figure 3:
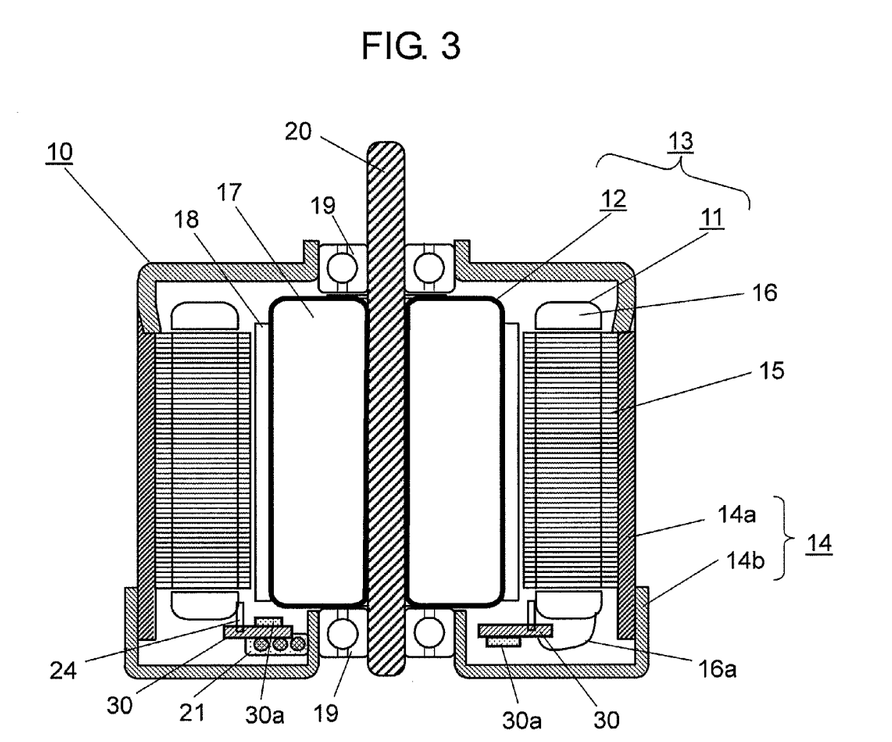
FIG. 3 is a sectional view of a motor device according to the first embodiment.

FIG. 3 is a sectional view of motor device 10 according to the first embodiment of the present invention. In this embodiment, a description is made of an example of an inner-rotor brushless motor that has a rotor rotatably placed closer to the inner circumference of the stator. Motor device 10 of this embodiment has multi-phase coils and each phase is driven by signals that have undergone pulse-width modulation (PWM).

As shown in FIG. 3, motor device 10 includes motor 13 having stator 11 and rotor 12, circuit substrate 30, and motor case 14. Motor case 14 is formed of a sealed, cylindrical metal. Motor device 10 contains circuit substrate 30 together with motor 13 in such motor case 14. Motor case 14 is composed of case body 14a and case lid 14b, where case lid 14b is attached to case body 14a, thereby forming substantially sealed motor case 14.

In FIG. 3, stator 11 is formed of stator iron core 15 with by-phase coils 16 wound therearound. In this embodiment, a description is made of an example where coil 16 segmented into three phases (i.e., U, V, and W phases 120 degrees phase-shifted from one another) are wound around stator iron core 15. Stator iron core 15 has two or more projecting electrodes projecting toward the inner circumference. The outer circumference of stator iron core 15 is roughly cylindrical and is fixed to case body 14a.

The inside of stator 11 has rotor 12 inserted thereinto through a gap. Rotor 12 holds cylindrical permanent magnet 18 on the outer circumference of rotor frame 17 and is rotatably placed centering on rotation shaft 20 supported by bearing 19. In other words, these components are placed so that the tip surface of each projecting electrode of stator iron core 15 faces the outer circumferential surface of permanent magnet 18.

Such stator 11 and rotor 12 compose motor 13.

Motor device 10 further incorporates circuit substrate 30 with various types of circuit components 30a mounted thereon into motor case 14 through support member 24. These circuit components 30a compose a motor control drive circuit for controlling and driving motor 13. Stator iron core 15 has support member 24 attached thereto, and circuit substrate 30 is fixed to the inside of motor case 14 through support member 24. Each end of coils 16 (U, V, and W phases) is drawn out from stator 11 as lead wire 16a, and each lead wire 16a is connected to circuit substrate 30. Further, circuit substrate 30 is supplied with power supply voltage and control signals through connector 21.

To achieve such a structure, first insert stator 11 into the inside of case body 14a to fix stator 11 to the inner surface of case body 14a. Next, store circuit substrate 30 inside case body 14a, and then fasten case lid 14b to case body 14a. Assembling the components in such a procedure allows forming motor device 10 with motor 13 and the motor control drive circuit integrally incorporated into motor case 14.

Supplying motor device 10 structured as above with power supply voltage and control signals from the outside through connector 21 causes the motor control drive circuit formed on circuit substrate 30 to pass a drive current through coil 16, which generates a magnetic field from stator iron core 15. Then, the magnetic field from stator iron core 15 and that from permanent magnet 18 generate an attractive force and a repulsive force according to the polarities of the magnetic fields. The forces cause rotor 12 to rotate centering on rotation shaft 20. As described above, one tip of rotation shaft 20 has blowing fan 103 attached thereto, and thus fan 103 rotates following rotation of rotor 12. Then, blowing air generated by rotation of fan 103 causes blower apparatus 100 to cool to-be-cooled objects.

Next, a description is made of the motor control drive circuit according to the first embodiment, formed of circuit components 30a mounted on circuit substrate 30.

Figure 4:
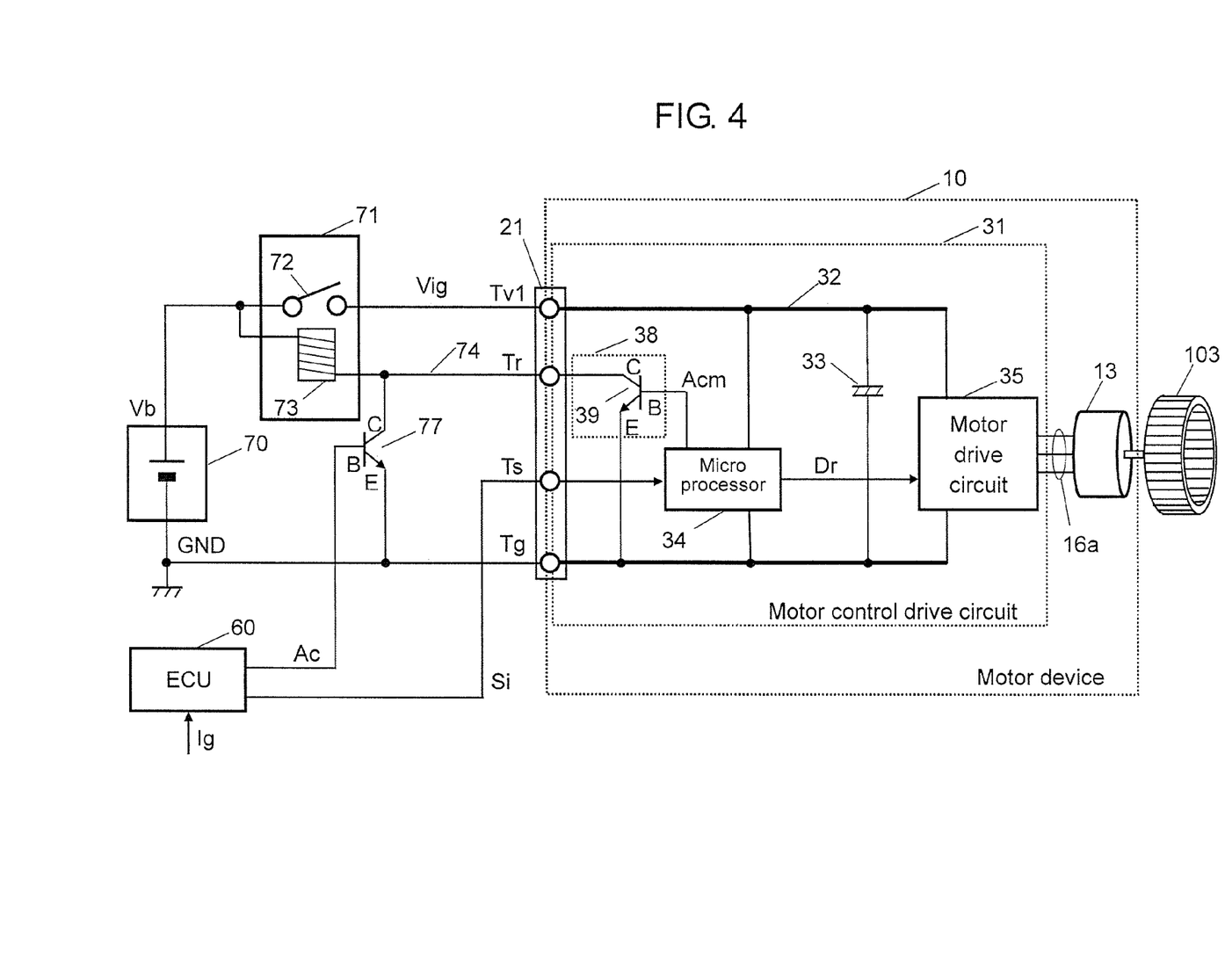
FIG. 4 is a block diagram illustrating the configuration of an in-vehicle fan cooling control system including the motor device according to the first embodiment.

FIG. 4 is a block diagram illustrating the configuration of an in-vehicle fan cooling control system including motor device 10 according to the first embodiment. FIG. 4 shows an example configuration of an in-vehicle fan cooling control system centering on the power supply system for motor device 10 equipped in blower apparatus 100.

In FIG. 4, rotation of motor device 10 is controlled by electronic control unit (ECU) 60 that is an upper-level controller. ECU 60 is a main control device that performs main control of a vehicle, composed mainly of a microprocessor, ROM, and RAM, to perform various types of in-vehicle control including control of blower apparatus 100. FIG. 4 shows an example where ECU 60 further performs control of the power supply system.

A vehicle such as an automobile usually incorporates a battery, and electrical equipment on the vehicle operates on this battery as power supply. Continuing to use the battery with the engine in a stop state causes a dead battery, and thus the power supply system of an automobile stops supplying power when the engine is in a stop state. More specifically, an automobile usually has two series of power supply for operating in-vehicle electrical equipment: +B power supply directly supplied from the battery and ACC power supply that can be used when the accessory switch included in the ignition switch is turned on.

FIG. 4 shows the configuration in which motor device 10 is connected to the power supply system with battery 70 as a power source. Note that battery 70 is an auxiliary battery for an electric vehicle. In FIG. 4, the negative voltage of battery 70 is connected to ground GND; the positive voltage of battery 70 is connected to relay 71 as power supply voltage Vb. Relay 71 has relay contact 72 and coil 73 for controlling open/close of relay contact 72. Power supply voltage Vb from battery 70 is connected to one end of relay contact 72 and to one end of coil 73. Emitter E of transistor 77 is connected to ground GND; collector C, to the other end of coil 73; and base B, to ECU 60. Then, ECU 60 controls energization to coil 73 through transistor 77.

More specifically, when ECU 60 applies control voltage to base B of transistor 77, the path between emitter E and collector C turns on. This passes a current through coil 73 to close relay contact 72, which turns on relay 71. Then, power supply voltage Vb is output from the other end of relay contact 72. On the other hand, when ECU 60 stops applying control voltage to base B of transistor 77, the path between emitter E and collector C turns off. This stops passing a current through coil 73 to open relay contact 72, which turns off relay 71. Then, supply of power supply voltage Vb from the other end of relay contact 72 stops.

Such a power supply structure including relay 71 is an example of the structure of the above-described ACC power supply, where relay 71 functions as a power supply switch that is on-off controlled according to a state of the vehicle ignition switch. In other words, ECU 60 is supplied with ignition state signal Ig indicating a state of the ignition switch, and supplies base B of transistor 77 with relay control signal Ac according to ignition state signal Ig. Concretely, when the ignition switch is on and the engine is operating or the ignition switch is in the accessory mode, ECU 60 outputs relay control signal Ac such that transistor 77 turns on. On the other hand, when the ignition switch is off, namely the engine is in a stop state, ECU 60 outputs relay control signal Ac such that transistor 77 turns off. In this way of operation, when the ignition switch is on or in the accessory mode, power supply voltage Vb is output from relay 71. When the ignition switch is off, power supply voltage Vb output from relay 71 is cut off. For motor device 10 of blower apparatus 100, power supply voltage Vig as power supply voltage Vb from battery 70 through relay 71 is supplied to the power supply input terminal. Note that power supply voltage Vig supplied to motor device 10 may be power supply that is on-off controlled exclusively for blower apparatus 100, instead of ACC power supply as described above.

ECU 60 outputs notice signal Si indicating information and commands for controlling motor device 10. Notice signal Si contains for instance a signal that controls motor device 10 for a rotation drive state and a stop state, as a rotation-command signal.

To connect power supply with signals as above, connector 21 of motor device 10 includes GND terminal Tg connected to ground GND, power supply input terminal Tv1 connected to power supply voltage Vig, and signal terminal Ts connected to notice signal Si. Connector 21 further includes relay control terminal Tr connected to the other end of coil 73 of relay 71.

Next, a description is made of the structure of motor control drive circuit 31. Motor control drive circuit 31 includes internal power line 32, smoothing capacitor 33, microprocessor 34, motor drive circuit 35, and cut off control circuit 38. Cut off control circuit 38 includes transistor 39.

Internal power line 32, connected to power supply input terminal Tv1, is a power line that distributes power supply voltage Vig in motor device 10. Smoothing capacitor 33 is connected between internal power line 32 and ground GND. Smoothing capacitor 33 is provided for smoothing power supply voltage Vig to reduce noise superimposed on the power line and is a large-capacity capacitor such as an electrolytic capacitor. Power supply voltage Vig is supplied to microprocessor 34 and motor drive circuit 35 through internal power line 32. Microprocessor 34 and motor drive circuit 35 operate on this power supply voltage Vig. Meanwhile, when relay 71 turns off, the supply of power supply voltage Vig is stopped, which causes microprocessor 34 and motor drive circuit 35 to be in an inoperable state.

Motor drive circuit 35 has an inverter for instance that generates AC power from DC power, to generate AC driving voltage that electrically drives coil 16 of motor 13 using voltage Vig supplied. Motor drive circuit 35 applies the generated driving voltage to respective coils 16 to electrically drive coil 16. This causes an AC current to flow through coils 16, thereby rotating rotor 12.

Microprocessor 34 performs various types of control in motor device 10 including control of motor drive circuit 35. Microprocessor 34 is informed of notice signal Si from ECU 60. Microprocessor 34 decodes notice signal Si to perform processes and control according to the decoded result. For example, when microprocessor 34 is informed of a signal that commands to start rotation through notice signal Si, microprocessor 34 outputs drive command signal Dr that commands motor drive, to motor drive circuit 35. Motor drive circuit 35 electrically drives coil 16 according to this drive command signal Dr, and motor device 10 starts rotation.

Cut off control circuit 38 has a function that cuts off the supply of power supply voltage Vig to internal power line 32 according to a command from microprocessor 34. This embodiment is configured so that cut off control circuit 38 controls relay 71 for an off state, to cut off the supply of power supply voltage Vig to motor device 10. To achieve such a configuration, the other end of coil 73 of relay 71 (i.e., the end connected to transistor 77) is connected to relay control terminal Tr of connector 21 through relay connection wire 74. Concretely, cut off control circuit 38 includes transistor 39. Base B of transistor 39 is connected to relay control signal Acm from microprocessor 34. Emitter E of transistor 39 is connected to ground GND; and collector C is connected to relay control terminal Tr. When control voltage is applied to base B of transistor 39 through relay control signal Acm, the path between emitter E and collector C turns on. When control voltage applied to base B is stopped, on the other hand, the path between emitter E and collector C turns off.

As shown in FIG. 4, this embodiment has circuitry in which collector C of transistor 39 is connected with collector C of transistor 77 through relay connection wire 74. In other words, wire connection is made so that connection between collectors C of both transistors forms a wired OR circuit. Accordingly, only when both transistors 39 and 77 are off, relay 71 is off, which cut off the supply of power supply voltage Vig. Meanwhile, at least either one of transistors 39 and 77 is on, relay 71 is on, which supplies power supply voltage Vig.

This embodiment uses such circuitry including cut off control circuit 38 that cut off the supply of power supply voltage Vig to internal power line 32 according to a command from microprocessor 34, to control the supply of power to blower apparatus 100. Such control of the supply of power allows blower apparatus 100 to continue rotation even after the ignition switch is turned off and also allows completely cutting off the supply of power from the power supply when the rotation ends, thereby eliminating dark current.

Figure 5:
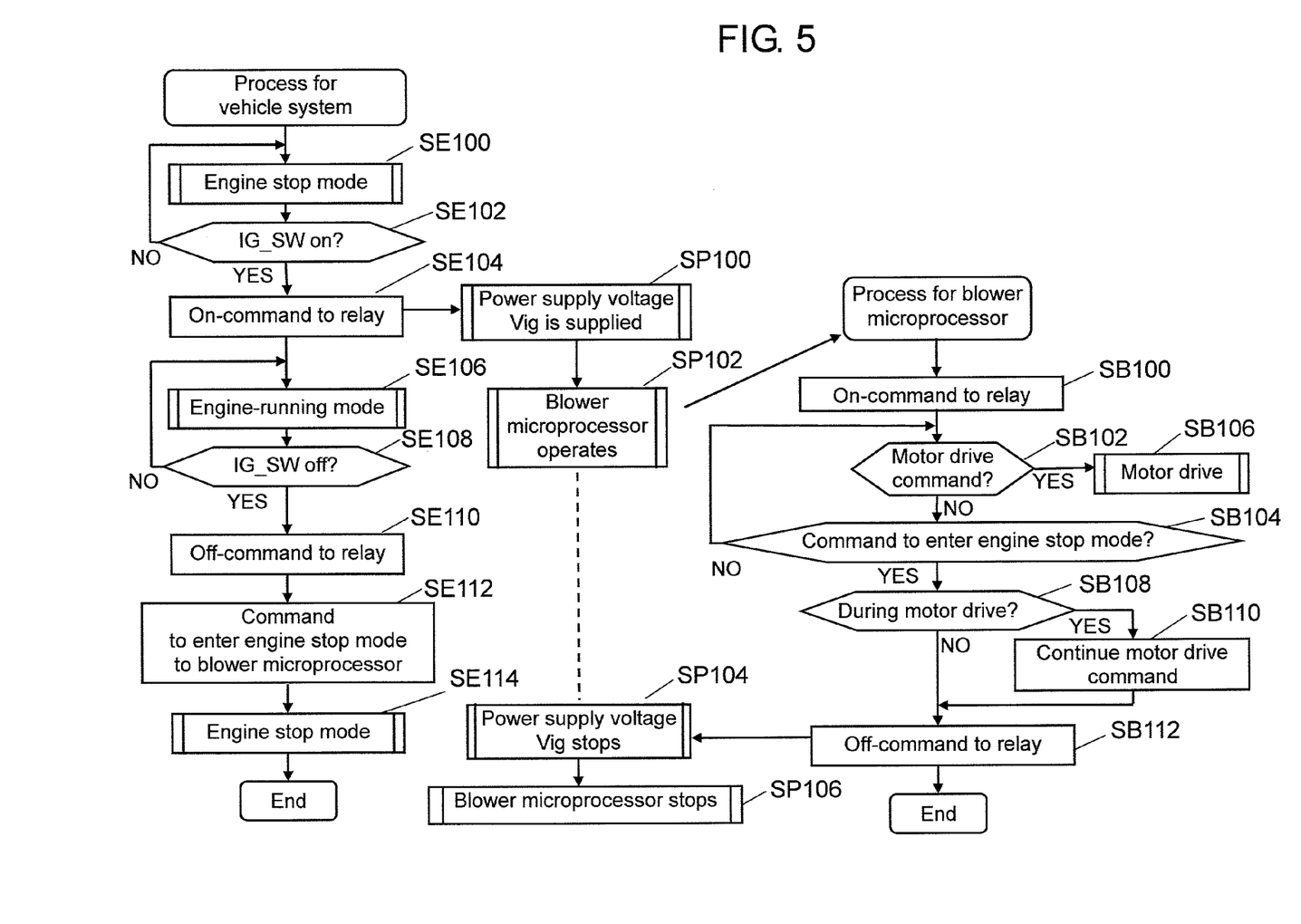
FIG. 5 is a flowchart illustrating the process of the in-vehicle fan cooling control system including the motor device according to the first embodiment.

Next, a description is made of operation of this embodiment referring to a flowchart illustrating the method for controlling an in-vehicle blower apparatus of the present invention. FIG. 5 is a flowchart illustrating the process of the in-vehicle fan cooling control system including motor device 10 according to the first embodiment.

In FIG. 5, steps SE100 through SE114 show the processes that ECU 60 executes in a vehicle system; and steps SB100 through SB112 show the processes that microprocessor 34 included in motor device 10 executes. Steps SP100 through SP106 show states of the power supply and microprocessor 34.

First, when the ignition switch has been turned off and the engine is at a stop, ECU 60 is in the engine stop mode where only some major functions are working, like a sleep mode (step SE100). ECU 60 monitors the on-off state of ignition switch (IG_SW). When the ignition switch is off, ECU 60 continues this monitoring; when ECU 60 determines that the ignition switch has been turned on, ECU 60 proceeds to the next process (step SE102).

When ECU 60 determines that the ignition switch has been turned on, ECU 60 sends an on-command so that relay 71 turns on (step SE104). Concretely, ECU 60 turns on transistor 77 through relay control signal Ac. This also turns on relay 71, which supplies power supply voltage Vig to motor device 10 (step SP100). When motor device 10 is supplied with power supply voltage Vig, microprocessor (blower microprocessor) 34 starts its operation (step SP102).

Next, ECU 60 enters the regular engine-running mode (step SE106), and ECU 60 performs various types of processes and control related to the vehicle. For control of blower apparatus 100 for instance, when blowing is needed, ECU 60 commands microprocessor 34 to motor-drive to perform control so that motor device 10 rotates; when blowing is not needed any more, ECU 60 commands microprocessor 34 to motor-stop to perform control so that motor device 10 stops rotation. Further, ECU 60 monitors the on-off state of the ignition switch even in the engine-running mode. When the ignition switch is on, ECU 60 continues this monitoring; when ECU 60 determines that the ignition switch has been turned off, ECU 60 proceeds to the next process (step SE108).

Meanwhile, when ECU 60 enters the engine-running mode, microprocessor 34 starts its operation. First, microprocessor 34 sends an on-command so that relay 71 turns on (step SB100). Concretely, microprocessor 34 turns on transistor 39 through relay control signal Acm. Note that transistor 77 is already on at this moment and thus relay 71 is not actually controlled by the process of step SB100.

After then, microprocessor 34 monitors a command for motor drive from ECU 60 (step SB102). Microprocessor 34 further monitors a command from ECU 60 that commands to enter the engine stop mode (step SB104). Microprocessor 34 continues controlling motor drive circuit 35 according to the decision at step SB102 until ECU 60 issues a command that commands to enter the engine stop mode. Microprocessor 34, when determining that a command for motor drive has been issued, performs control so that motor drive circuit 35 drives motor 13 (step SB106); when determining that a command for motor stop has been issued, performs control so that motor drive circuit 35 stops driving motor 13.

Concretely, ECU 60 in the engine-running mode, when determining that blowing by blower apparatus 100 is needed, sends out notice signal Si that commands to start rotation, to motor device 10. Microprocessor 34 receives this notice signal Si and outputs drive command signal Dr that commands motor drive, to motor drive circuit 35. Motor drive circuit 35 electrically drives coil 16 according to this command, and motor device 10 starts rotation. Meanwhile, ECU 60 in the engine-running mode, when determining that blowing by blower apparatus 100 is not needed any more, sends out notice signal Si that commands to stop rotation, to motor device 10. Microprocessor 34 receives this notice signal Si and outputs drive command signal Dr that commands the motor to stop, to motor drive circuit 35. Motor drive circuit 35 stops electrically driving coil 16 according to this command, and motor device 10 stops rotation.

Next, ECU 60 in the engine-running mode, when determining that the ignition switch has been turned off, sends an off-command that commands to turn off relay 71 (step SE110). Concretely, ECU 60 turns off transistor 77 through relay control signal Ac. Note that transistor 39 is already on at this moment and thus relay 71 is not actually controlled by the process of step SE110. That is, relay 71 is on and the supply of power supply voltage Vig from relay 71 continues.

Next, ECU 60 performs control so that microprocessor 34 enters the engine stop mode (step SE112). Concretely, ECU 60 sends out notice signal Si that commands to enter the engine stop mode, to microprocessor 34. Subsequently, ECU 60 enters the engine stop mode (step SE114).

Further, microprocessor 34 enters the engine stop mode according to a command in the process of step SE112 by ECU 60. First, microprocessor 34 determines whether or not the motor is being driven (step SB108). When the motor is being driven, microprocessor 34 continues issuing a motor drive command for a given period of time, to motor drive circuit 35 (step SB110). When the motor is at a stop, microprocessor 34 directly proceeds to the next process. That is, in this embodiment, even if the ignition switch has been turned off and ECU 60 has entered the engine stop mode, blower apparatus 100 is supplied with power supply voltage Vig. Accordingly, blower apparatus 100 including microprocessor 34 is allowed to continue its operation, thereby appropriately cooling to-be-cooled objects.

Microprocessor 34 receives a command that commands to enter the engine stop mode, from ECU 60 and continues such motor drive as required, and then sends an off-command so that relay 71 turns off (step SB112). Concretely, microprocessor 34 turns off transistor 39 through relay control signal Acm. At this moment, transistor 77 is already off, and thus relay 71 turns off to stop the supply of power supply voltage Vig to motor device 10 (step SP104). This stops operation of microprocessor 34 as well (step SP106). Here, the supply of power supply voltage Vig to motor device 10 including microprocessor 34 is to be completely cut off, which eliminates dark current due to blower apparatus 100.

The process from when microprocessor 34 receives a command for the engine stop mode from ECU 60 until when microprocessor 34 stops the supply of power supply voltage Vig can be other than that of FIG. 5. Specifically, cooling may be performed as follows. That is, after microprocessor 34 receives a command for the engine stop mode from ECU 60, microprocessor 34 performs control so that motor device 10 always rotates for a certain period of time regardless of whether or not motor device 10 is operating. Another cooling method may be as follows. That is, a temperature sensor is attached to a to-be-cooled object; microprocessor 34 receives a sensor signal from the temperature sensor; and microprocessor 34 performs control so that motor device 10 rotates until the temperature according to the sensor signal falls below a given level. After such a process ends, the supply of power supply voltage Vig is stopped to eliminate dark current. In this way, blower apparatus 100 incorporates microprocessor 34, which controls cutoff of power supply to itself according to its own decision, and thus blower apparatus 100 performs its processes flexibly even after the ignition switch is turned off while eliminating dark current. Blower apparatus 100 incorporates such microprocessor 34, and thus simply providing blower apparatus 100 in a vehicle allows achieving flexible processes and eliminating dark current after the ignition switch is turned off.

According to this embodiment, it is necessary only that relay connection wire 74 is connected to relay 71, besides existing power supply and control lines from the ECU connected to the blowing apparatus. Accordingly, blower apparatus 100 can be easily incorporated into an existing vehicle system equipped with an ECU, with a minimum of changes. Further, the cut off control circuit can be formed of single transistor 39, which is easily implemented.

Second Exemplary Embodiment

Figure 6:
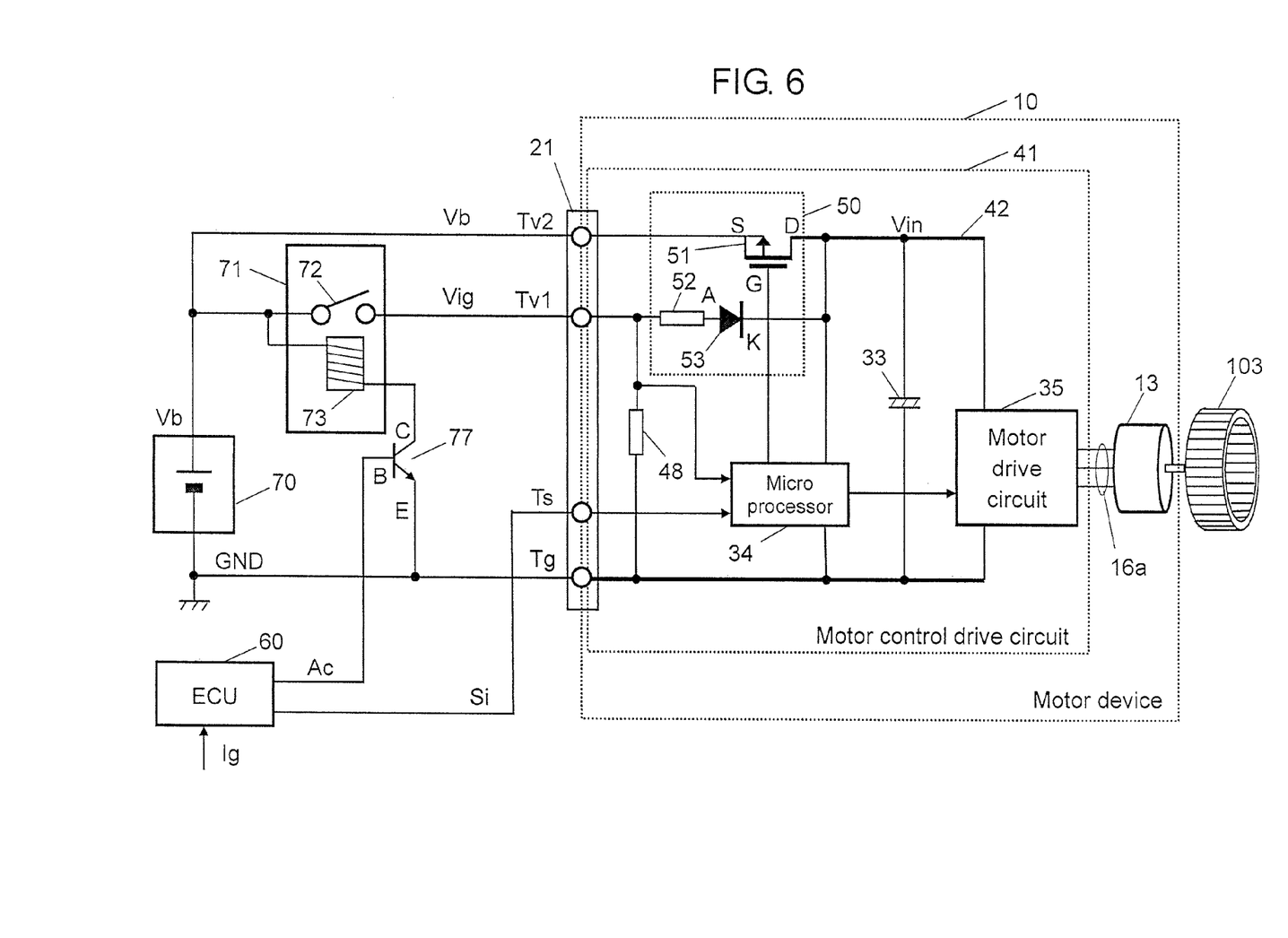
FIG. 6 is a block diagram illustrating the configuration of an in-vehicle fan cooling control system including a motor device, of a blower apparatus according to the second exemplary embodiment of the present invention.

FIG. 6 is a block diagram illustrating the configuration of an in-vehicle fan cooling control system including motor device 10, of blower apparatus 100 according to the second exemplary embodiment of the present invention. Similarly to FIG. 4, FIG. 6 shows an example configuration of an in-vehicle fan cooling control system centering on the power supply system for motor device 10 equipped in blower apparatus 100. Note that motor device 10 and blower apparatus 100 equipped with motor device 10 of this embodiment have the same structural configuration as that of the first embodiment described in FIGS. 1 through 3, and thus detailed description is omitted. This embodiment is different from the first one in the structure of the motor control drive circuit. In FIG. 6, a component same as that of FIG. 4 is given the same reference mark to omit its detailed description.

Motor device 10 of this embodiment shown in FIG. 6 is supplied with power supply voltage Vig as first power supply voltage through relay 71 and with power supply voltage Vb as second power supply voltage directly from battery 70. To connect power supply voltage and signals as above, connector 21 of motor device 10 includes GND terminal Tg connected to ground GND, power supply input terminal Tv1 connected to power supply voltage Vig, second power supply input terminal Tv2 connected to power supply voltage Vb, and signal terminal Ts connected to notice signal Si from ECU 60.

In the same way as in the first embodiment, ECU 60 controls relay 71 according to a state of the ignition switch. More specifically, when the ignition switch is on or in the accessory mode, ECU 60 turns on transistor 77, which causes power supply voltage Vig to be output as power supply voltage Vb from relay 71. When the ignition switch is off, on the other hand, ECU 60 turns off transistor 77, which cut off output of power supply voltage Vb from relay 71. Further, ECU 60 outputs notice signal Si that indicates information and commands for controlling motor device 10.

Next, a description is made of the structure of motor control drive circuit 41. Motor control drive circuit 41 is composed of circuit components 30a on circuit substrate 30 as shown in FIG. 3. In this embodiment as well, motor device 10 included in blower apparatus 100 integrally incorporates motor 13 and motor control drive circuit 41 composed of circuit components 30a into motor case 14.

Motor control drive circuit 41 includes internal power line 42, smoothing capacitor 33, microprocessor 34, motor drive circuit 35, first resistor 48, and cut off control circuit 50 according to the embodiment. Cut off control circuit 50 includes transistor 51 as a switch element, second resistor 52, and diode 53.

This embodiment has a configuration in which power supply voltage supplied to first power supply input terminal Tv1 and second power supply input terminal Tv2 is supplied to internal power line 42 through cut off control circuit 50. The path between internal power line 42 and ground GND is connected to smoothing capacitor 33. Then, microprocessor 34 and motor drive circuit 35 are supplied with power supply voltage Vin as internal power supply voltage through such internal power line 42. In this embodiment, power supply input terminal Tv2 is supplied with power supply voltage Vb directly from battery 70, and thus battery 70 is usable regardless of a state of relay 71.

Transistor 51 of cut off control circuit 50 is provided as a switch element for supplying and cutting off power supply voltage Vb supplied to power supply input terminal Tv2 to internal power line 42. Source S of transistor 51 is connected to power supply input terminal Tv2; drain D, to internal power line 42; and gate G, to microprocessor 34. Consequently, when microprocessor 34 applies control voltage to gate G of transistor 51, the path between source S and drain D turns on, which causes power supply voltage Vb supplied to power supply input terminal Tv2 to be supplied to internal power line 42. When microprocessor 34 stops applying control voltage to gate G, on the other hand, the path between source S and drain D turns off, which cuts off the supply of power supply voltage Vb to internal power line 42 through transistor 51.

Cut off control circuit 50 further includes a circuit formed by series-connecting second resistor 52 and diode 53. One end of resistor 52 is connected to power supply input terminal Tv1; the other end of resistor 52, to anode A of diode 53; and cathode K of diode 53, to internal power line 42. This circuitry, when relay 71 is on, allows power supply voltage Vig supplied to power supply input terminal Tv1 to be supplied to internal power line 42 through resistor 52 and diode 53.

In other words, this embodiment has two paths for supplying power supply voltage Vin to internal power line 42: a path through transistor 51 and a path through resistor 52 and diode 53. A detail description is made later of control of these paths. Roughly, power supply voltage Vin is supplied through resistor 52 and diode 53 when the ignition switch is on or in the accessory mode, and then microprocessor 34 turns on transistor 51, through which power supply voltage Vin is supplied. When the ignition switch is turned off, microprocessor 34 makes transistor 51 continue an on state for a given period of time to continue rotation of blower apparatus 100 according circumstances such as a thermal environment even after the ignition switch is turned off. Subsequently, when postprocessing such as rotation is completed, microprocessor 34 turns off transistor 51 to completely cut off the supply of power from the power supply, which eliminates dark current.

In this way, the embodiment as well uses circuitry including cut off control circuit 50 that cut off the supply of power supply voltage Vin to internal power line 42 according to a command from microprocessor 34, to control supply of power to blower apparatus 100. Such control of supply of power allows blower apparatus 100 to continue rotation even after the ignition switch is turned off and also allows completely cutting off the supply of power from the power supply when the rotation ends, thereby eliminating dark current.

Power supply input terminal Tv1 is connected to ground GND through first resistor 48, and to a voltage detection terminal of microprocessor 34. In the embodiment, this structure allows microprocessor 34 to determine a state of the ignition switch according to voltage to power supply input terminal Tv1.

In the meantime, internal power line 42 is connected to smoothing capacitor 33. Accordingly, when power is supplied directly to internal power line 42 through relay 71, a large amount of current to charge smoothing capacitor 33 is to flow at the moment when relay 71 turns on, where such a current is called an inrush current.

On the other hand, this embodiment as described above is configured so that power is supplied from relay 71 through resistor 52 and diode 53 when the ignition switch is on or in the accessory mode. That is, when the power supply is activated, smoothing capacitor 33 is first charged while resistor 52 is acting on a large amount of current such as an inrush current for current limiting. A sufficiently high voltage of smoothing capacitor 33 provides power supply voltage Vin high enough for microprocessor 34 to operate. Subsequently, microprocessor 34 that has started its operation controls transistor 51 for an on state, which supplies power supply voltage Vb to internal power line 42 through transistor 51. At this time point, smoothing capacitor 33 is adequately charged, and thus a large amount of current such as an inrush current does not flow. This embodiment is configured to operate in this way when the ignition switch is on or in the accessory mode, to limit the current capacity of transistor 51 and relay 71, thereby downsizing these components while preventing destruction and shortening of life due to a large amount of current.

In this embodiment, diode 53 is connected in series with resistor 52 to prevent a current from flowing from drain D of transistor 51 into power supply input terminal Tv1. Accordingly, when relay 71 turns off, the voltage to power supply input terminal Tv1 changes to the ground GND level due to resistor 48.

In this embodiment, such a configuration allows microprocessor 34 to determine the on-off state of relay 71.

Figure 7:
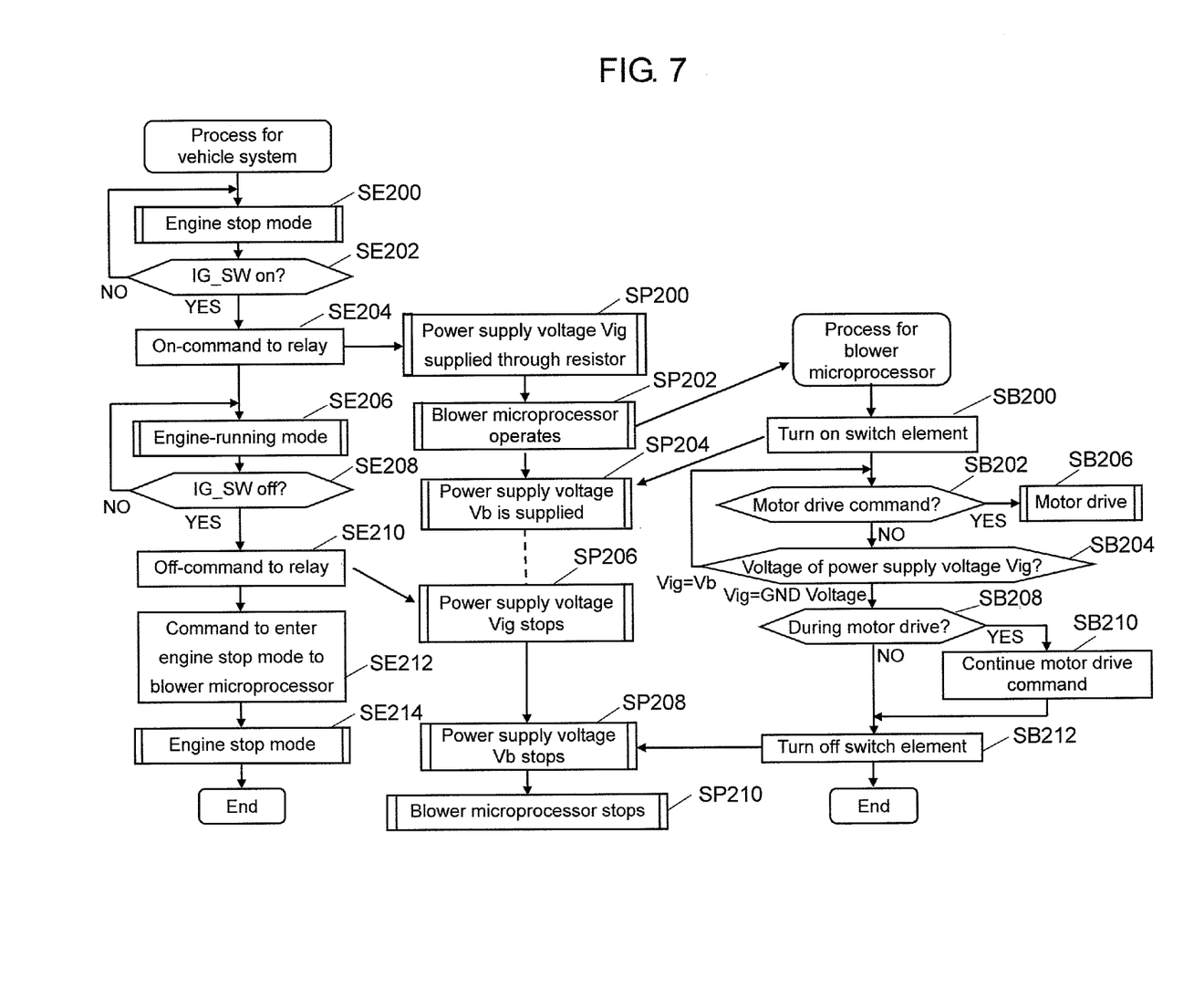
FIG. 7 is a flowchart illustrating the process of the in-vehicle fan cooling control system including the motor device according to the second embodiment.

Next, a description is made of operation of this embodiment, referring to the flowchart illustrating the method for controlling an in-vehicle blower apparatus of the present invention. FIG. 7 is a flowchart illustrating the process of the in-vehicle fan cooling control system including motor device 10 according to the second embodiment.

In FIG. 7, steps SE200 through SE214 show the processes that ECU 60 executes in a vehicle system; and step SB200 through SB212 show the processes that microprocessor 34 included in motor device 10 executes. Steps SP200 through SP210 show states of the power supply and microprocessor 34.

First, when the ignition switch is off and the engine is at a stop, ECU 60 is in the engine stop mode similarly to the first embodiment (step SE200). ECU 60 monitors the on-off state of ignition switch (IG_SW). When the ignition switch is off, ECU 60 continues this monitoring; when ECU 60 determines that the ignition switch has been turned on, ECU 60 proceeds to the next process (step SE202).

When ECU 60 determines that the ignition switch has been turned on, ECU 60 sends an on-command so that relay 71 turns on (step SE204). Concretely, ECU 60 turns on transistor 77 through relay control signal Ac. This also turns on relay 71, which supplies power supply voltage Vig to internal power supply line 42 of motor device 10 through resistor 52 and diode 53 (step SP100). Note that microprocessor 34 is not operating at the time point and transistor 51 is off. Capacitor 33 is charged through resistor 52, which prevents an excessive current from flowing. In motor control drive circuit 41, when smoothing capacitor 33 is adequately charged and power supply voltage Vin of internal power line 42 is sufficiently high, microprocessor (blower microprocessor) 34 starts its operation (step SP202).

Next, ECU 60 enters the engine-running mode similarly to the first embodiment (step SE206), and ECU 60 performs various types of processes and control (including control of blower apparatus 100) related to the vehicle. ECU 60 monitors the on-off state of ignition switch even in the engine-running mode. When the ignition switch is on, ECU 60 continues this monitoring; when ECU 60 determines that the ignition switch has been turned off, ECU 60 proceeds to the next process (step SE208).

Meanwhile, at roughly the same time when ECU 60 enters the engine-running mode, microprocessor 34 starts its operation. First, microprocessor 34 performs control so that transistor 51 as a switch element turns on (step SB200). This causes power supply voltage Vb supplied to power supply input terminal Tv2 to be supplied to internal power line 42 through transistor 51 (step SP204).

After then, microprocessor 34 monitors a command for motor drive from ECU 60 (step SB202). Microprocessor 34 further monitors power supply voltage Vig to power supply input terminal Tv1 (step SB204). Microprocessor 34 continues controlling motor drive circuit 35 according to the decision at step SB202 until power supply voltage Vig changes to the voltage of ground GND, namely relay 71 turns off. Microprocessor 34, when determining that a command for motor drive has been issued, performs control so that motor drive circuit 35 drives motor 13 (step SB206); when determining that a command for motor stop has been issued, performs control so that motor drive circuit 35 stops driving motor 13. Concretely, ECU 60 and microprocessor 34 controls start and stop of blowing by blower apparatus 100 in the engine-running mode, in the same way as in the first embodiment.

Next, ECU 60 in the engine-running mode, when determining that the ignition switch has been turned off, sends an off-command that commands to turn off relay 71 (step SE210). Concretely, ECU 60 turns off transistor 77 through relay control signal Ac, which turns off relay 71 as well.

Microprocessor 34 determines that relay 71 has been turned off, by the voltage to power supply input terminal Tv1. More specifically, when power supply voltage Vig changes to the voltage of ground GND, microprocessor 34 determines that relay 71 has been turned off and enters the engine stop mode. First, microprocessor 34 determines whether or not the motor is being driven (step SB208). When the motor is being driven, microprocessor 34 continues issuing motor drive commands for a given period of time, to motor drive circuit 35 (step SB210). When the motor is at a stop, microprocessor 34 directly proceeds to the next process. That is, in this embodiment as well, even if the ignition switch has been turned off and ECU 60 has entered the engine stop mode, internal power supply line 42 is supplied with power supply voltage Vb through transistor 51. Accordingly, blower apparatus 100 including microprocessor 34 is allowed to continue its operation, which appropriately cools to-be-cooled objects even after the vehicle stops.

Microprocessor 34, after determining that relay 71 has been turned off, continues such motor drive as required, and then performs control so that transistor 51 turns off (step SB212). At this moment, relay 71 is already off, and thus the supply of power supply voltage to internal power supply line 42 is stopped (step SP208). This stops operation of microprocessor 34 as well (step SP210). Here, the supply of power supply voltage Vin to internal power supply line 42 of motor device 10 including microprocessor 34 is to be completely cut off, which eliminates dark current due to blower apparatus 100. Note that the process from when microprocessor 34 determines that relay 71 is off until when microprocessor 34 stops the supply of power to internal power supply line 42 can be other than that of FIG. 7, similarly to the first embodiment.

In this way, blower apparatus 100 of this embodiment as well incorporates microprocessor 34, and microprocessor 34 controls cutoff of power supply to itself according to its own decision, and thus performs its processes flexibly even after the ignition switch is turned off while eliminating dark current. Blower apparatus 100 incorporates such microprocessor 34, and thus simply providing blower apparatus 100 in a vehicle allows achieving flexible processes and eliminating dark current after the ignition switch is turned off.

Further, this embodiment is configured to supply power from relay 71 through resistor 52 and diode 53 when the ignition switch is on or in the accessory mode, which limits an inrush current, thereby downsizing the relay and transistor while preventing destruction and shortening of life due to a large amount of current.

As described above, a blower apparatus of the present invention is configured so that power supply voltage from a battery is supplied to the power supply input terminal through a power supply switch on-off controlled according to a state of the vehicle ignition switch. The blower apparatus includes a motor that has a stator with a coil wound therearound and a rotor placed rotatably centering on the rotation shaft; a blowing fan attached to the rotation shaft; a motor drive circuit that electrically drives the coil; a microprocessor that controls the motor drive circuit; and a motor case that integrally contains the motor, the motor drive circuit, and the microprocessor. The blower apparatus further includes an internal power line that supplies power supply voltage applied to the power supply input terminal to the motor drive circuit and the microprocessor in the motor case; a smoothing capacitor connected to the internal power line; and a cut off control circuit that cuts off the supply of power supply voltage to the internal power line according to a command from the microprocessor.

This structure allows supplying power supply voltage to the microprocessor and the motor drive circuit even after the ignition switch is turned off, which enables continuing rotation according to circumstances such as a thermal environment. Further, the cut off control circuit cuts off the supply of power supply voltage to the internal power line that applies power to the microprocessor and the motor drive circuit, according to a command from the microprocessor, which allows completely cutting off the supply of power from the power supply, thereby eliminating dark current.

A method for controlling a blower apparatus in a vehicle of the present invention is a method for controlling a blower apparatus in a vehicle that includes a main control device performing main control of the vehicle, a power supply switch on-off controlled according to a state of the ignition switch by the main control device, and a blower apparatus that has a microprocessor operated on power supply voltage supplied from a battery to the internal power line through the power supply switch. In the control method, when the ignition switch has been turned on, the power supply switch turns on according to a command from the main control device, to supply power supply voltage to the internal power line. Meanwhile, when the ignition switch is turned off, the microprocessor executes a process for the blower apparatus, and then cuts off the supply of power supply voltage to the internal power line according to a command from the microprocessor.

By such a method, power supply voltage is supplied to the blower apparatus including the microprocessor even after the ignition switch is turned off, which allows continuing rotation according to circumstances such as a thermal environment. Further, the cut off control circuit cuts off the supply of power supply voltage to the internal power line that applies power to the microprocessor, according to a command from the microprocessor, which allows completely cutting off the supply of power from the power supply, thereby eliminating dark current.

INDUSTRIAL APPLICABILITY

A motor drive device and a method for controlling a blower apparatus in a vehicle, according to the present invention is suitable for an in-vehicle cooling blower, particularly useful to a cooling blower incorporated into a hybrid vehicle or an electric vehicle operating on a large-size battery.

The invention claimed is:

1. A blower apparatus in which power supply voltage from a battery is supplied to a power supply input terminal through a power supply switch of which on-off control is made according to a state of an ignition switch of a vehicle, comprising:
   a motor having a stator with a coil wound therearound and a rotor disposed rotatably about a rotation shaft;
   a blowing fan on the rotation shaft;
   a motor drive circuit for electrically driving the coil;
   a microprocessor for controlling the motor drive circuit;
   a motor case integrally containing the motor, the motor drive circuit, and the microprocessor;
   an internal power line for supplying the power supply voltage applied to the power supply input terminal to the motor drive circuit and the microprocessor in the motor case;
   a smoothing capacitor connected to the internal power line; and
   a cut off control circuit for cutting off supply of the power supply voltage to the internal power line according to a command from the microprocessor,
   wherein the cut off control circuit makes the power supply switch turn off to cut off supply of the power supply voltage to the internal power line.

2. A blower apparatus in which power supply voltage from a battery is supplied to a power supply input terminal through a power supply switch of which on-off control is made according to a state of an ignition switch of a vehicle, comprising:
   a motor having a stator with a coil wound therearound and a rotor disposed rotatably about a rotation shaft;
   a blowing fan on the rotation shaft;
   a motor drive circuit for electrically driving the coil;
   a microprocessor for controlling the motor drive circuit;
   a motor case integrally containing the motor, the motor drive circuit, and the microprocessor;
   an internal power line for supplying the power supply voltage applied to the power supply input terminal to the motor drive circuit and the microprocessor in the motor case;
   a smoothing capacitor connected to the internal power line; and
   a cut off control circuit for cutting off supply of the power supply voltage to the internal power line according to a command from the microprocessor,
   wherein the blower apparatus further comprising:
   a second power supply input terminal in combination with a first power supply input terminal denoted by the power supply input terminal, to which the power supply voltage is directly supplied from the battery; and
   a resistor set between the first power supply input terminal and the internal power line, wherein the resistor limits an inrush current from the first power supply input terminal, and
   wherein the cut off control circuit has a switch element set between the second power supply input terminal and the internal power line, and makes the switch element turn off to cut off supply of the power supply voltage to the internal power line.

3. A method for controlling a blower apparatus in a vehicle, the vehicle including:
   a main control device for performing main control of the vehicle;
   a power supply switch of which on-off control is made by the main control device according to a state of an ignition switch; and
   a blower apparatus in which power supply voltage is supplied from a battery to an internal power line through the power supply switch, and having a microprocessor operating on the power supply voltage,
   the method comprising the steps of:
   supplying the power supply voltage to the internal power line by turning on the power supply switch according to a command from the main control device when the ignition switch is turned on;
   having the microprocessor execute a given process for the blower apparatus when the ignition switch is turned off; and then
   cutting off the power supply voltage to the internal power line according to another command from the microprocessor.

4. The method for controlling a blower apparatus in a vehicle of claim 3, wherein the step of cutting off the power supply voltage to the internal power line is carried out by having the microprocessor send the command to turn off the power supply switch.

5. The method for controlling a blower apparatus in a vehicle of claim 3, wherein the step of cutting off the power supply voltage to the internal power line is carried out by having the microprocessor send the command to turn off a switch element provided in the blower apparatus and connecting the power supply voltage supplied directly from the battery to the internal power line.

* * * * *